United States Patent [19]

Johnson

[11] 4,424,763

[45] Jan. 10, 1984

[54] CITRUS PULP LITTER FOR PET ANIMALS

[75] Inventor: Robert M. Johnson, Weston, Conn.

[73] Assignee: Green Mountain Products, Inc., Norwalk, Conn.

[21] Appl. No.: 471,660

[22] Filed: Mar. 3, 1983

Related U.S. Application Data

[63] Continuation-in-part of Ser. No. 376,584, May 10, 1982, Pat. No. 4,386,580.

[51] Int. Cl.³ .............................................. A01K 1/015
[52] U.S. Cl. ........................................................ 119/1
[58] Field of Search ............................................ 119/1

[56] References Cited

U.S. PATENT DOCUMENTS

| | | | |
|---|---|---|---|
| 1,967,333 | 7/1934 | Smith et al. | 119/1 |
| 2,179,591 | 11/1939 | Godchaux | 119/1 |
| 2,597,457 | 5/1952 | Cook | 119/1 |
| 2,708,418 | 5/1955 | Sugarman et al. | 119/1 |
| 3,122,127 | 2/1964 | Shechmeister et al. | 119/18 |
| 3,816,577 | 6/1974 | Neckermann | 119/1 |
| 3,821,346 | 6/1974 | Batley, Jr. | 119/1 |
| 4,271,787 | 6/1981 | Wellman | 119/1 |
| 4,308,825 | 1/1982 | Stepanian | 119/1 |

OTHER PUBLICATIONS

Dr. Robert H. Harms and Dr. C. B. Ammerman, "Feeding Value of Poultry Litter Containing Citrus Pulp for Ruminants," Feedstuffs, 9-7-68, pp. 21, 22.

Primary Examiner—Hugh R. Chamblee
Attorney, Agent, or Firm—Allen D. Brufsky; Barry R. Lipsitz

[57] ABSTRACT

A litter material, and the method of manufacture thereof, for deodorizing and absorbing the excreta from animals, and particularly, pet animals. The litter contains a mixture of dried citrus pulp bits and fines of specified sizes which coat the animal feces and absorb urine, respectively. The residual acids and sugars left in the dried pulp serve to neutralize the odor of the excreta.

2 Claims, No Drawings

CITRUS PULP LITTER FOR PET ANIMALS

This application is a continuation-in-part of my co-pending U.S. patent application Ser. No. 376,584 filed May 10, 1982, entitled "Animal Litter and Method for Deodorizing Animal Waste with Dried Citrus Pulp", now U.S. Pat. No. 4,386,580.

BACKGROUND OF THE INVENTION

The present invention relates to a new litter for coating, absorbing, and deodorizing animal wastes, and more particularly the excreta from pets, such as cats, and the method of manufacture thereof. The litter is made from a mixture of dried citrus pulp bits of specified sizes.

Pet animals are extremely popular in present day homes, resulting in a need for dealing with animal wastes. Such wastes must be dealt with in a hygienic manner, and preferably in a manner which will also prevent the spread of obnoxious odors throughout the household.

In the past, deodorizer material for pet animals has consisted of inert absorbent particulate material for absorbing animal waste, particularly urine, optionally with odor masking agents and the like. Among such materials which have been used are vermiculite, saw dust, kaolin, ground wood pulp and the like. Other materials, such as molasses serum, as disclosed in U.S. Pat. No. 3,821,346 and cherry pits, disclosed in U.S. Pat. No. 3,816,577, have also been used for pet litters. Further, U.S. Pat. No. 2,179,591 discloses the use of sugar cane pulp as a poultry litter and animal bedding material. U.S. Pat. No. 2,597,457 discloses the use of straw, wood fibers, or peat moss for use as a poultry litter material.

Other attempts to solve the problem of animal waste disposal have utilized cages having an absorbent liner with an odor masking material therein. Such deodorizing materials function effectively for relatively short periods of time, however, they require frequent changing in order to prevent the emission of objectionable odors from the animal cages. Such devices can also be rather expensive, particularly where absorbent mats and the like are concerned. This high expense detracts from the acceptance of such devices in the marketplace.

Numerous efforts have been made in the art toward discovering more efficient alternatives to the known deodorizing materials. In view of the intended use of such materials for pets and the like, the art has long recognized that any such materials must be produced from relatively cheap starting materials in order that the products can be marketed at a cost consistent with those presently utilized.

It would therefore be advantageous to have an inexpensive material, i.e. litter, which serves to deodorize animal excreta, and in particular to have such a litter which is adapted for use by cats and like animals. Such a litter should be capable of dealing with both feces and urine, and should utilize readily available raw materials. It would be a further advantage if the litter material used with such a process would easily coat an animal's feces and absorb the animal's urine.

The present invention relates to such a litter.

SUMMARY OF THE INVENTION

In accordance with the present invention, animal waste is deodorized by having the waste deposited in contact with dried citrus pulp containing bits and fines of specified sizes. The dried citrus pulp is obtainable by squeezing raw citrus fruit to remove the juice therefrom, cutting the squeezed citrus fruit into small pieces of citrus pulp, drying the citrus pulp, and chopping the dried pulp into bits, which are of a size to coat and adhere to the animal's feces. Alternatively, the pulp may be chopped into bits prior to drying or the bulk material after cutting and drying is sifted through a series of screens to remove a large proportion of the pulp particles above the required bit size necessary to coat and adhere to the animal's feces, and which are digable by the animal. Fines, or particles of even smaller size than the bits, are also retained naturally in admixture with the bits and serve to absorb the animal's urine.

DETAILED DESCRIPTION OF THE INVENTION

The present invention relates to deodorizing animal waste by having the waste deposited in contact with dried citrus pulp containing bits and fine particles of specified sizes.

Citrus pulp comprises the skin, the cells adhered to the interior of the skin, the seeds, and the stems of citrus fruit such as oranges, grapefruits, and lemons. In any given quantity of citrus pulp, it is not unusual that a small amount of extraneous matter will be mixed therewithin. For purposes of the present invention, citrus pulp can be considered to be whatever material is left over after the useable juices, sugars, and liquors have been extracted from citrus fruit.

The citrus pulp used in the present invention is dried after all of the useable materials (e.g. juice, sugars, liquors) have been removed from the fruit. The pulp may be dried in a large tumbler drier, similar to a conventional clothes dryer but on a much larger scale. For example, a dryer used to dry citrus pulp may be fired by gas or oil, which heats air that is blown into a drum on the order of 60 feet long by 20 feet in diameter. The citrus pulp is tumbled within the drum, with the hot air blowing over the pulp. Such dried citrus pulp has a deodorizing quality and because it is dry, will readily absorb liquids brought into contact therewith.

It has been found that when such citrus pulp is placed into contact with animal excreta, the dried pulp absorbs moisture from the excreta, adheres to animal feces, and deodorizes both urine and feces.

The ability of the dried citrus pulp to adhere to the animal feces is particularly important, in that the feces can be completely coated with the dried citrus pulp thereby deodorizing the feces in an efficient manner. This aspect is of particular importance when the method of the present invention is used to deodorize the excreta from cats. Cats are known to dig in a litter material, after they have excreted, to cover up the excrement. When dried citrus pulp is used as a litter for cats, the deodorizing ability thereof is enhanced due to the adherence of the dried pulp to the excrement.

Dried citrus pulp for use in connection with the present method can be prepared by first washing citrus fruits, and then squeezing the fruit in a conventional squeezing machine. The juice extracted from the fruit in the squeezing process can be used for human consumption in a variety of products. Usable oils are also extracted from the fruits during the squeezing process. In a preferred embodiment, lime or dolomitic limestone is then added to the squeezed citrus fruit. The purpose of the lime or dolomitic limestone is to remove the soft, moist, slippery coating which would otherwise remain on the squeezed fruit as a result of the squeezing process. Thus, the lime or dolomitic limestone serves to facilitate the further processing of the squeezed fruit by automated machinery.

The squeezed fruit is then cut into small pieces of citrus pulp. The cutting can be accomplished in a conventional hammer mill. It is noted that the cutting step could occur before the squeezing step, however it is more economical to perform the squeezing step first.

The fruit can then be pressed a second time to extract additional sugars and liquors which are of value in other products, for example to manufacture a citrus molasses. The citrus pulp is then dried by any conventional means, e.g., in a tumbler dryer as described above, and separated, e.g. by sifting the mixture through a screen or series of screens, from extraneous granular particles and powder which typically are co-mingled with the dried citrus pulp. These granular particles and powders are known in the trade as "fines".

After the citrus pulp has been dried and separated from the fines, it is chopped into smaller pieces, or "bits" for use as a litter material. The chopping may be done in any conventional manner, for example by use of a conventional grinding or chipping machine. Alternatively, the pulp may be chopped into bits and separated prior to drying.

The size of the chopped bits is important in determining the suitability of the dried citrus pulp as a litter material. The size of the bits must be such as to allow the bits to adhere to an animal's feces in order to coat the feces. The dried citrus pulp bits are not pliable and therefore if they are too large in size, they will not be capable of sufficiently coating the animal's feces. On the other side of the scale, the dried citrus pulp bits must not be so small that they will be in powder form, such that they could become airborne. It is preferable, however, that some fines be present because it has been found that they are valuable in admixture with the bits to absorb the animal's urine. Furthermore, the bits must be small enough that they don't look like citrus fruit skin, but large enough that they are digable by the animal using them, e.g. a cat.

In satisfying the above-mentioned criteria, it has been found that the citrus pulp bits should be somewhere in the range of from approximately $\frac{1}{8}$ inch to $\frac{3}{8}$ inch on each side thereof. The optimal size would be somewhere around $\frac{1}{4}$ inch square. Sufficient fines of less than $\frac{1}{8}$ inch on each side thereof should be present in admixture with the bits in an approximate ratio of 90/80 to 10/20 of bits to fines by weight; the optimum ratio being about 85:15.

The desired particle size may also be obtained by processing the citrus pulp in a conventional manner, i.e.; squeezing and extracting the sugars and liquors therefrom, cutting the squeezed fruit into small pieces and drying it, and then sifting the dried and cut pulp through a screen or series of screens to remove or "strain out" larger bits of $\frac{3}{8}$ inch and greater, leaving the bits of $\frac{3}{8}$ inch and smaller and fines which occur naturally in limited quantities, without resorting to secondary grinding or chopping.

The size of the citrus bits and fines in the litter material manufactured using the methods described above was analyzed to confirm the particle size and ratio of the mixture obtained. A representative 10 pound sample was sifted through a series of measured screens as follows:

Screen 1, #8—0.028, wherein there are eight openings per lineal inch and whose wire diameter is 0.028 inch. This screen will permit the passage of particles 0.097 inch or smaller.

Screen 2, #14—0.020, wherein there are fourteen openings per lineal inch and whose wire diameter is 0.020 inch. This screen will permit the passage of particles of 0.051 inch or smaller.

Screen 3, #30—0.011, wherein there are thirty openings per lineal inch and whose wire diameter is 0.011 inch. This screen will permit the passage of particles of 0.022 inch or smaller.

The weights and percentages of the graded sample was found to be as follows:

1. 133.7 ounces or 83.5% was too large to fit through the first screen #8—0.028. This major portion of the sample ranged in size from $\frac{1}{8}$ to $\frac{3}{8}$ inch. A small undertermined amount was between 0.125 and 0.098 inches. For all practical purposes the major portion of the sample in the $\frac{1}{8}$ to $\frac{3}{8}$ inch category.
2. 15 ounces or 9.4% was sifted through the first screen 8—0.028 (whose hole size was 0.097 inch) but would not pass through the next screen whose hole size was 0.051.
3. 7 ounces or 4.4% was sifted through the second screen (whose hole size was 0.051 inch) but would not pass through the next size screen whose hole size was 0.022; and
4. 4.3 ounces or 2.7% was sifted through the third screen whose hole size was 0.022 inch.

Summarizing, from the 10 pound (160 oz.) sample 83.5% was chip size pulp $\frac{1}{8}$ to $\frac{3}{8}$ inch square and 16.5% was "fines" (small particles 1/10 inch or smaller) necessary in the absorption of urine. The sizes of the chip and granular portion (fines) were as follows:

133.7 oz. or 83.5% = $\frac{3}{8}$ to $\frac{1}{8}$ inch
15 oz. or 9.4% = 0.097 to 0.052 inch
7 oz. or 4.4% = 0.051 to 0.023 inch
4.3 oz. or 2.7% = 0.022 inches or less
Chips $\frac{1}{8}$ to $\frac{3}{8}$ inch = 83.5% by weight
Fines 0.097 inch and smaller = 16.5% by weight The use of the dried citrus pulp, as set forth herein, in contact with animal waste has been found to be an extremely effective for absorbing and deodorizing the pet waste. The pulp can be placed in a box so that a pet, such as a cat, can be trained to return thereto whenever it has to urinate and/or defecate. The pulp can also be prepackaged in boxes or trays for sale to a pet owner, said boxes or trays being suitable for use by the pet immediately upon opening.

The present litter is useful for deodorizing the waste of many different animals, including cats, dogs, hamsters, gerbils, rats and other like domesticated pets or animals. Likewise, the deodorizer is suitable for domesticated birds or other pets such as reptiles. Of course, the invention is also useful in zoos and other applications. Thus, the description contained herein is considered in all respects to be illustrative and not restrictive, the scope of the invention being indicated by the appended claims rather than by the foregoing description.

I claim:
1. Animal litter comprising:
a mixture of dried citrus pulp particles having approximately 80% to 90% by weight of bits of a size between approximately $\frac{1}{8}$ to $\frac{3}{8}$ inch on each side thereof for adhering to and coating animal solid waste, and the remainder fines of a size of less than

⅛ inch on each side thereof for absorbing animal urine.

2. A mixture of dried citrus pulp particles for use as an animal litter comprising:
dried citrus pulp particles having a size within the range of about ⅛ inch to ⅜ inch on each side thereof for adhering to and coating animal waste; and
citrus pulp particles having a size of less than ⅛ inch on each side thereof for absorbing urine.

* * * * *